United States Patent [19]

Knolle

[11] 4,024,947
[45] May 24, 1977

[54] BULK MATERIAL CONVEYOR

[76] Inventor: Ernst G. Knolle, 2691 Sean Court, South San Francisco, Calif. 94080

[22] Filed: Apr. 29, 1976

[21] Appl. No.: 681,512

[52] U.S. Cl. .............................. 198/707; 198/703; 198/710; 198/792
[51] Int. Cl.$^2$ ...................................... B65G 17/12
[58] Field of Search .......... 198/703, 707, 710, 792; 104/20, 25; 214/42 R, 62 R, 301

[56] References Cited

UNITED STATES PATENTS

| 1,603,475 | 10/1926 | Kruckenberg | 104/20 |
|---|---|---|---|
| 1,725,653 | 8/1929 | Kruckenberg | 104/20 |
| 1,851,534 | 3/1932 | Baker et al. | 198/710 |
| 2,121,365 | 6/1938 | Pardee | 214/62 R |
| 3,031,066 | 4/1962 | Leach | 198/792 |
| 3,447,666 | 6/1969 | Nevo-Hacohen | 198/792 |
| 3,651,763 | 3/1972 | Iritani | 104/25 |
| R26,673 | 9/1969 | Knolle | 104/20 |

Primary Examiner—Evon C. Blunk
Assistant Examiner—Joseph E. Valenza
Attorney, Agent, or Firm—Owen, Wickersham & Erickson

[57] ABSTRACT

A bulk material conveying apparatus consisting of an endless chain of elongated containers is disclosed. Each container has a closed end and an open end, with orientation of the containers alternating so that in a horizontal traveling position, open ends are adjacent and in sealing relationship. The ends of successive containers are pivoted together, and guide tracks and followers are provided at and near loading and unloading stations so that as the containers approach the station they are rotated from a horizontal end to end position to a vertical side by side stacked together position. In the station the containers move slowly for loading or unloading, then are rotated back to the horizontal position as they progress for high speed travel to the other station. While traveling between stations the containers are inverted so that their open ends are up at loading stations and down at unloading stations.

9 Claims, 9 Drawing Figures

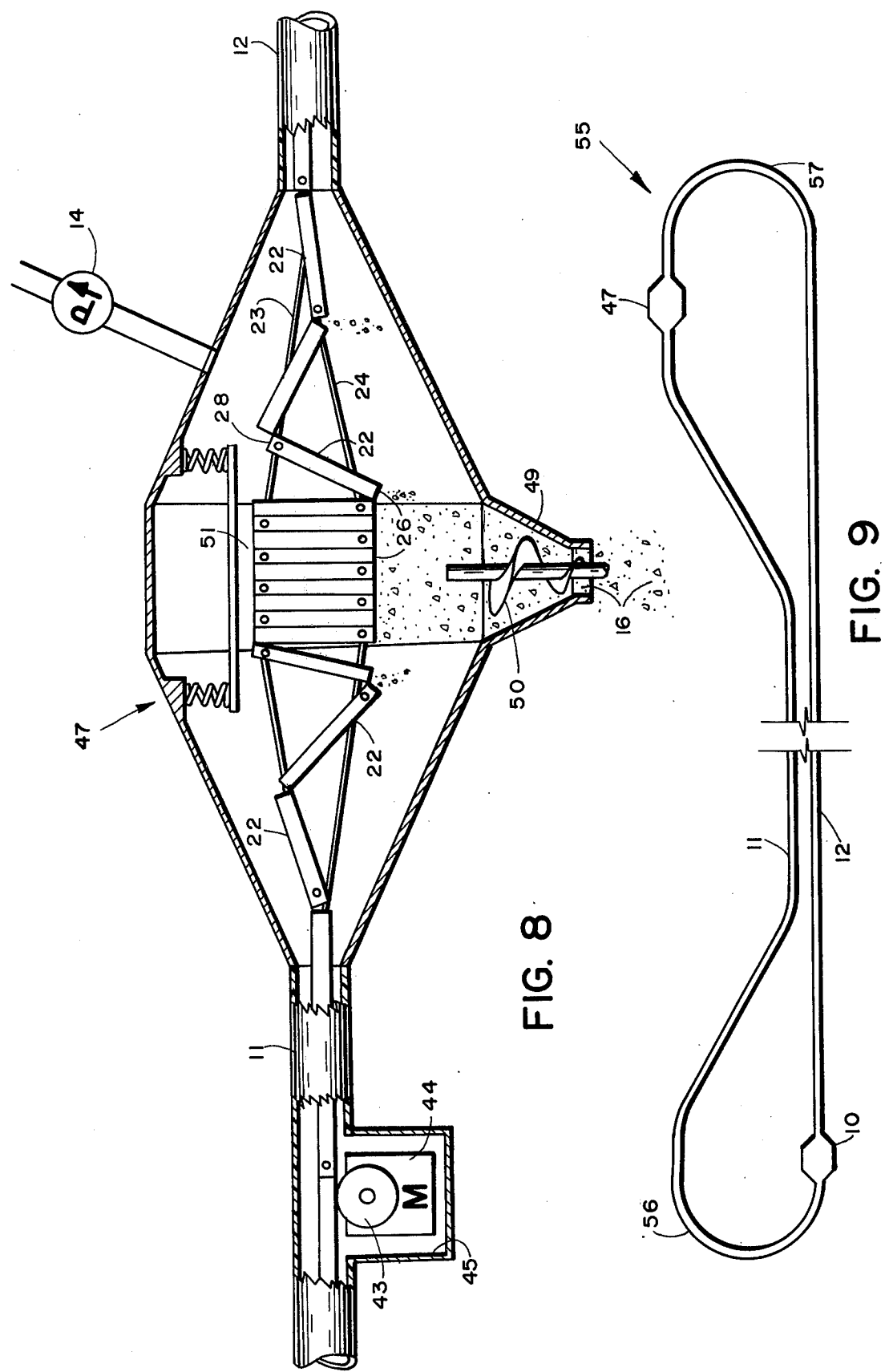

BULK MATERIAL CONVEYOR

BACKGROUND OF THE INVENTION

The invention relates to conveyor systems, and more particularly to a system having an endless chain of container links which move at high speeds between stations and at low speeds in stations.

The type of conveyor motion to which the invention relates is shown generally in Kruckenberg U.S. Pat. No. 1,725,653, Iritani U.S. Pat. No. 3,651,763, and my reissue U.S. Pat. No. 26,673 (original: 3,320,903). In such a motion a plurality of links of an endless driven chain ride on guide rails which direct them into end to end horizontal orientation for traveling between stations, but into stacked together side by side orientation at stations. The links thus travel at a much slower rate in the stations than between stations, the speed ratio being the ratio of the effective stacking width of the links to their effective lengths when stretched out end to end.

There is a need for an inexpensive, high-speed way of moving many materials, including for example coal and grain, which must often be transported over very long distances. Conventional transportation systems have proven highly expensive and often too time consuming for the transportation of such materials from very remote locations to the areas in which they will be used. For coal, a suggested solution has been to crush the coal, then mix it with a large portion of water to form a slurry which may be pumped through a pipeline to the destination. Such an undertaking requires extremely thick pipeline walls in order to withstand abrasion wear and the high pressures required for movement of the slurry, perhaps up to about 3,000 pounds per square inch. Even at such pressures, a slurry of 50% coal and 50% water would move at only a few feet per second through a relatively large diameter pipeline. Because of flow resistance and the fact that water as well as coal would be moved, such a system would demand a large amount of energy to operate. Also, large amounts of water must be supplied at the loading point and, following a separation process at the end point, must be somehow disposed of in a partially contaminated condition. If the piping is made of steel for the required strength, only a relatively short life could be expected, perhaps thirty years.

SUMMARY OF THE INVENTION

The present invention provides a highly efficient apparatus for transporting bulk materials such as coal or grain at high speed, wherein the material can be continuously loaded and unloaded through doorless openings at stations but is carried entirely enclosed between stations. Very little energy is required to operate the system in comparison to other means of transportation.

According to the invention, links of a driven endless chain consist of elongated containers, each with one end open and the other end closed. The containers are arranged in pairs with adjacent open ends alternating with adjacent closed ends, each container being pivotally attached to the preceding and succeeding containers for shifting between the horizontal end to end traveling position and a vertical side by side densely stacked position in stations. Guide tracks and corresponding followers on the container sides provide for such shifting and for the return of the containers from the dense side by side relationship in stations to extended end to end relation for high speed travel between stations. The guide tracks also provide for gradual rotation of each container of the chain about a longitudinal axis through one half turn, between the loading and the unloading station and vice versa. The purpose of this rotation is to cause open ends of the containers to be oriented upwardly in loading stations for gravity loading, and downwardly in unloading stations for gravity discharge. Between stations adjacent open ends close against each other to contain the bulk material.

Accordingly, it is among the objects of the invention to provide an inexpensive, high speed conveying apparatus with quick, dependable and continuous loading and unloading capabilities, and with a much greater life expectancy than, for example, a slurry pipeline. This and other objectives, advantages and features of the invention will become apparent from the following description of a preferred embodiment, taken in conjunction with the accompanying drawings.

DESCRIPTION OF THE DRAWINGS

FIG. 8 is a partially sectioned side elevation view of an unloading station connected to the conveyor pipeline.

FIG. 9 is a schematic elevational view showing a layout of the conveyor pipeline including an alternative scheme for rotating the links through 180° between stations.

DESCRIPTION OF A PREFERRED EMBODIMENT

Figure 1:
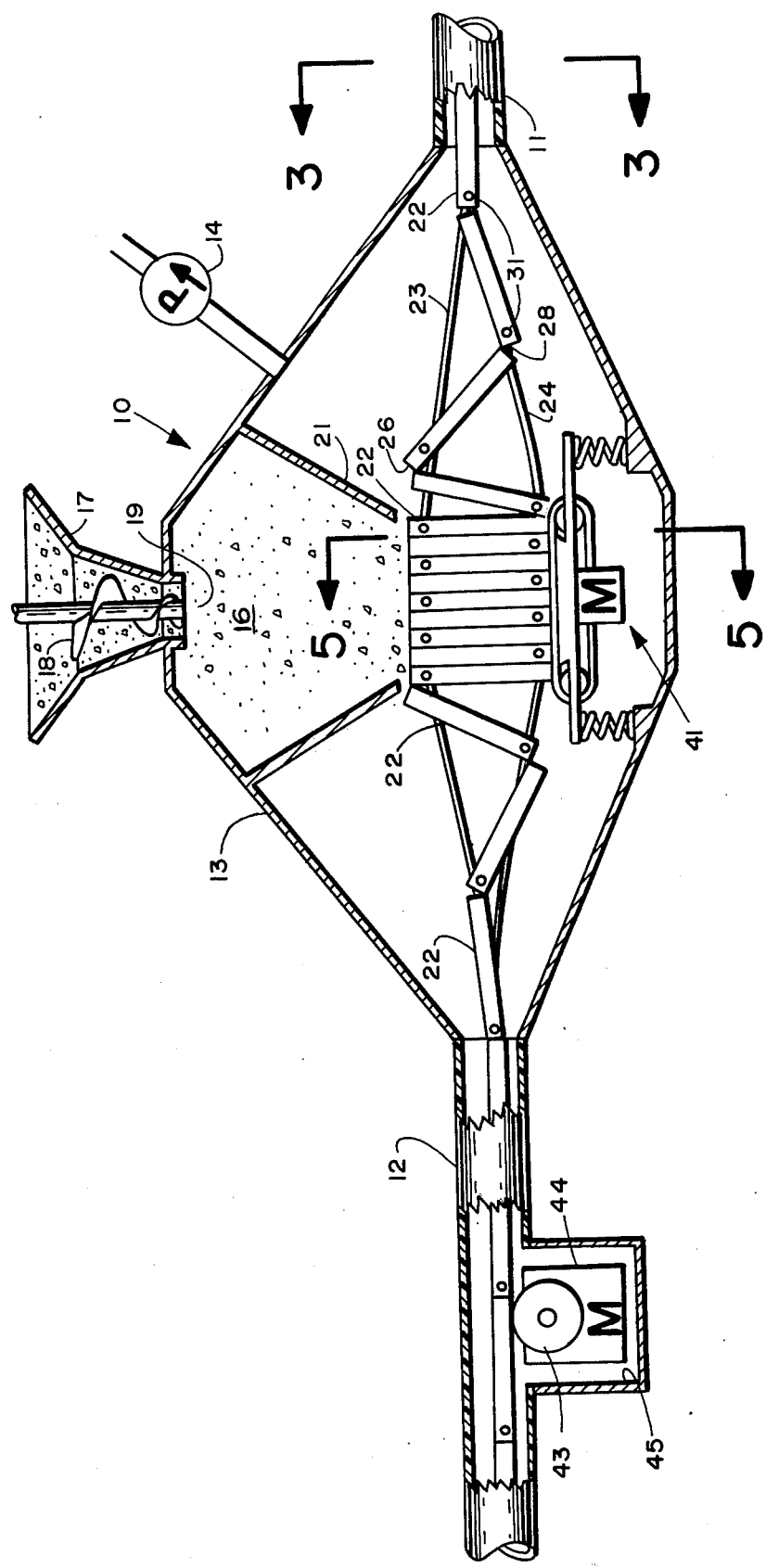
FIG. 1 is a partially sectioned side elevation view of sections of conveyor pipe carrying the chain of container links, with a loading station between the sections of pipe.

In the drawings, FIG. 1 schematically shows a loading station 10 of a bulk material conveying system including upstream and downstream sections 11 and 12 of transit tubing which is preferably made of plastic pipe. The section includes a housng 13 open to both sections of tubing and otherwise substantially sealed off from the outside atmosphere. A vacuum pump 14 maintains a lowered pressure inside the system to minimize air friction as will be discussed below. Crushed coal or other bulk material 16 is fed into the station from a hopper 17 by a tapered auger type screw conveyor 18 which compacts the material as it is fed to the lower open end 19 of the hopper, thereby substantially preventing the intrusion of air into the station 10 through the hopper. The bulk material 16 is continuously fed into the system.

Figure 2:
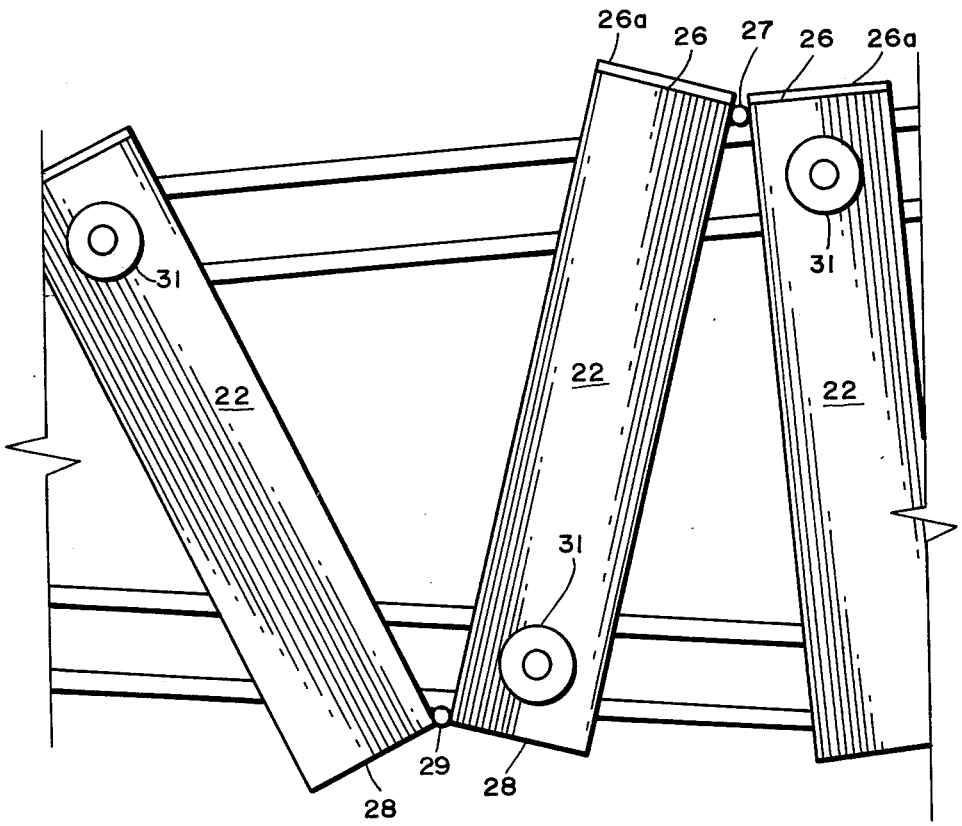
FIG. 2 is an enlarged schematic view of a portion of FIG. 1.

Below the hopper 17 and inside the loading station 10 is a material guide chute 21 positioned just above a densely clustered group of vertically oriented side by side bulk material containers 22. The tubular or rectangular elongated containers 22 have open tops but are otherwise closed, and they are constantly moving (from right to left in FIG. 1). Each of the containers 22 rides on and is guided by upper and lower pairs of tracks or rails 23 and 24 which may be of steel and which are generally in a configuration shown and described in my U.S. Pat. No. 3,320,903 reissued Sept. 30, 1969 as No. 26,673. In this schematic view only the far rails are shown for clarity, the near rails being eliminated to show the containers. Each pair of adjacent containers 22 are hinged together as shown in the enlarged view of FIG. 2, with a somewhat resilient or compressible sealing lip 26a about the open end 26 of each container. At the open ends 26, the hinge or pivot point 27 of a particular container is at one side, while at the closed end 28 of the same container the hinge or pivotal connection point 29 is at the opposite side of the container. This facilitates the dense stacking together of the containers 22 in side by side fashion as shown in FIG. 1. When the containers 22 are in extended end to end configuration as shown upstream and downstream of the station 10 in FIG. 1, the sealing lips 22 of adjacent open ends are compressed together to seal the two involved containers against leakage of contents. However, as the containers approach the station 10, as shown in FIGS. 1 and 2, the guide tracks 23 and 24 diverge from a single pair of tracks (not shown in FIGS. 1 and 2) and begin rotating the advancing containers from the horizontal position to a vertical position. In each case the adjacent closed ends of the containers 22 are guided onto the lower rails 24 in the loading station while the open ends 26 are guided along the upper set of rails 23. Therefore the containers are moved into a dense side by side cluster beneath the bulk material chute 21 with their open ends 26 upward. Though all of the containers 22 in the system are constantly moving, their speed while clustered in the vertical position is only a fraction of their speed in the horizontal position. The ratio of the speeds is the ratio between the width space taken by each container 22 in the vertical position to the length in the horizontal position, since the same number of units must pass the chute 21 in a given time period as pass by a point in the transit tube 11 or 12 during the same time period.

Figure 3:
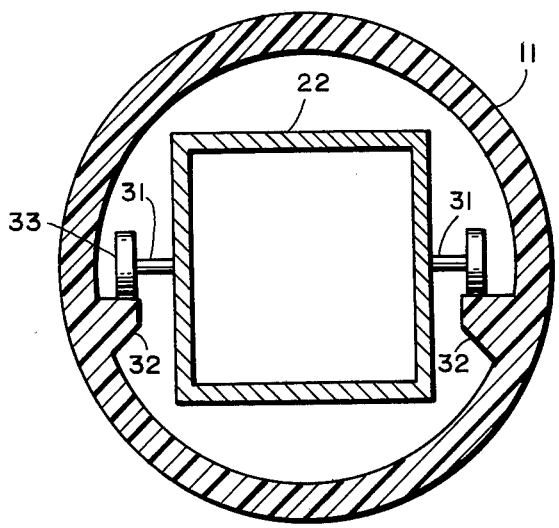
FIG. 3 is an enlarged cross sectional view of the pipe carrying the chain of containers, taken along the line 3—3 of FIG. 1.

FIG. 3 shows the transit tube 11 in cross section with a container 22 of the endless chain positioned in horizontal orientation inside. As indicated, each container 22 includes some sort of following means 31 extending from each side and resting upon a pair of tracks 32 in the tube. The tracks 32 may be integrally extruded into the tube 11 and are connected to the guide tracks 23 and 24 of the station 10. The followers 31 may include ball bearing supported rollers 33 for minimizing friction associated with the movement of the chain of containers 22 through the tubes. Referring back to FIG. 1, it is seen that the followers 31 need only be provided at one end of each container 22, since the other end of the container is hinged to and supported by the immediately succeeding container.

Figure 4:
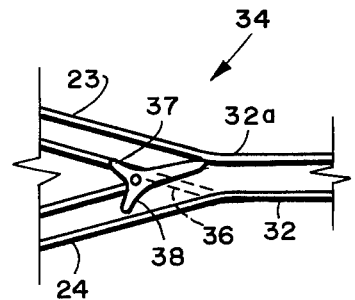
FIG. 4 is a schematic view of a junction in a track carrying and guiding the containers.

FIG. 4 schematically indicates a junction 34 between the tracks 32 of the transit tube and the upper and lower tracks 23 and 24 of the loading station. As indicated, an upper rail 32a may be provided for the track 32 as it approaches the junction 34 to ensure the proper channeling of the track followers 31 of the containers. This rail then forms the upper rail of the double-rail upper station track 23. The lower rail of the track 32 forms the lower rail of a double-rail lower station track 24. A switch 36 may be provided at the junction 34 to channel the track followers 31 associated with the closed container ends 28 onto the lower track 24, and the followers 31 associated with the open container ends 26 onto the upper track 23 in the material loading station 10. For changing position of the switch 36, it may include tail end levers 37 and 38 so that with each passage of the track follower 31 it is deflected to the opposite position, as can be envisioned from FIG. 4. However, it may be found that with the system properly set up and operating, the driven chain of container links 22 will naturally follow the proper tracks 23 and 24 without any switch at the junction 34 due to forces acting on the containers 22 and their track followers 31. These forces are caused primarily by the configuration of the upper and lower station tracks 23 and 24, the fact that the containers ahead are already in the vertical position, and the positioning of the pivot hinges 27 and 29 between the containers. The return junction (not shown) of the tracks 23 and 24 downstream of the loading area may be similar to the diverging junction 34, but no switch is needed or desirable here.

Figure 5:
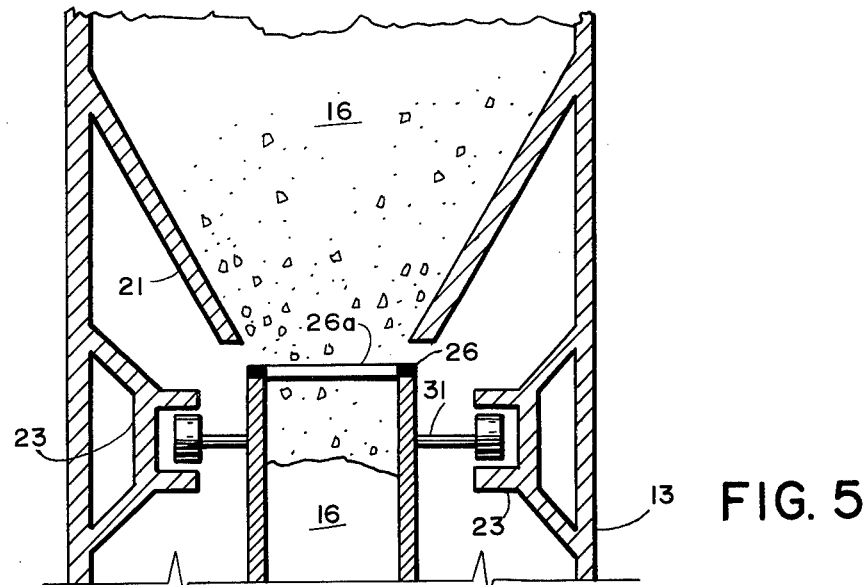
FIG. 5 is a schematic sectional elevation view taken along the line 5—5 of FIG. 1.

FIG. 5 is a schematic elevational section taken from FIG. 1, looking downstream at one of the vertically oriented containers 22 being filled with bulk material 16 via the chute 21 positioned closely above. On this particular container 22, the track followers 31 are positioned near the top in this loading station, near the open end 26; however, in the immediately preceding and succeeding containers, the followers 31 will be near the closed end 28, at the bottom of the container in this loading station, as discussed above in connection with FIG. 2.

Figure 6:
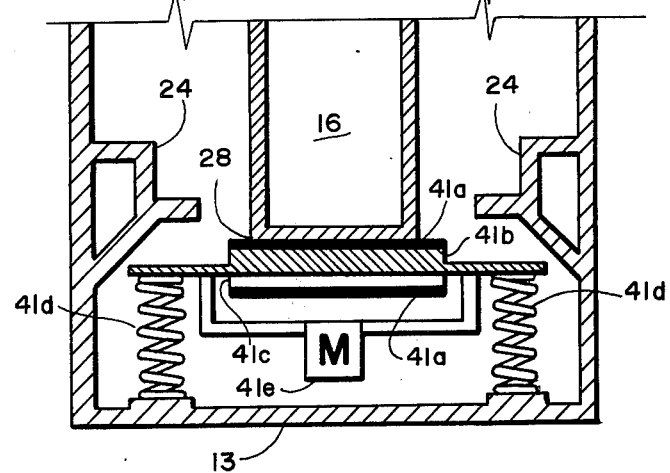
FIG. 6 is an enlarged schematic view showing a portion of the apparatus of FIG. 1.
Figure 6:
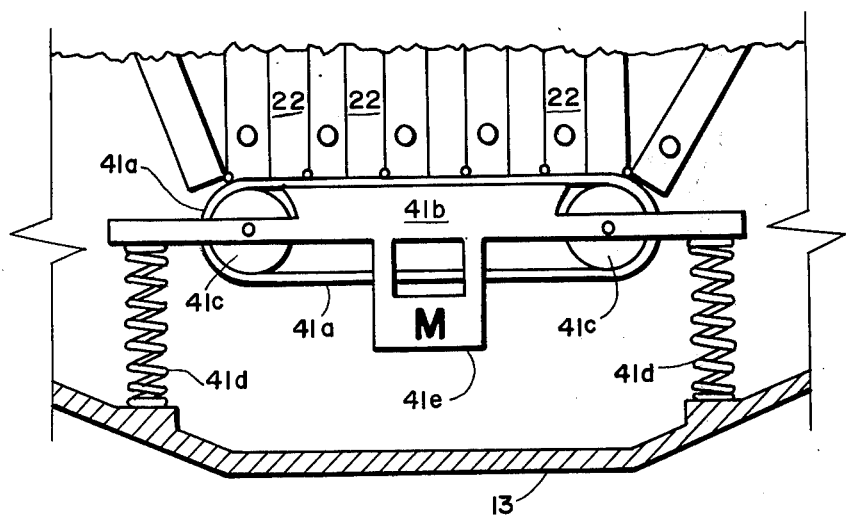

As shown in FIGS. 1 and 5 and in greater detail in FIG. 6, a support and vibrator assembly 41 is positioned just below the cluster of containers 22 as they are filled by gravity loading. In addition to supporting the weight of the containers as they are filled, the purpose of the assembly 41 is to vibrate the containers 22 as they are loaded so that the loosely loaded bulk material 16 will be compacted as it settles in the containers. Since the containers 22 are in motion, the assembly 41 may include an appropriately moving endless belt 41a sliding over a support pad 41b, which supports belt drums 41c and is itself supported on springs 41d. A motor 41e with an eccentric flywheel (not shown) may be suspended on the support pad 41b to provide the desired vibration of the assembly. An additional motor (not shown) may drive the belt 41a, or the movement of the containers 22 may be depended upon to move the belt.

The endless chain of container links 22 may be driven through the bulk material conveying system by any appropriate means such as frictional or gear-tooth engaged drive or even a linear motor drive, all of which are well known. Schematically indicated in FIG. 1 (and also in FIG. 8, discussed below) is one example of a drive means consisting of a friction drive assembly including a friction wheel 43 engaging the undersides of the horizontal containers 22. The wheel 43 is driven by a motor 44 of any suitable type, and as indicated, the motor and wheel may be fully enclosed in a chamber 45 which adjoins the transit tube 12 and is closed to the outside atmosphere. Alternatively, of course, only the driving wheel 43 may be enclosed (not shown), with the motor positioned outside but in driving engagement with a sealed shaft supporting the wheel.

As mentioned above, the purpose of the substantially sealed system and the subatmospheric pressure applied thereto is to reduce air resistance and friction created in connection with the traveling containers 22. The containers may be driven over hundreds of miles at a high rate of speed, perhaps 150 feet per second or greater. Substantial resistance would be developed by air at atmospheric pressure at such speeds, and in fact the heat of friction could become excessive. Thus, vacuum pumps such as the pump 14 are included as necessary along the transit pipeline to reduce the pressure to a practical level, thereby saving substantially on the energy requirements of the system and avoiding high heat levels.

Figure 7:
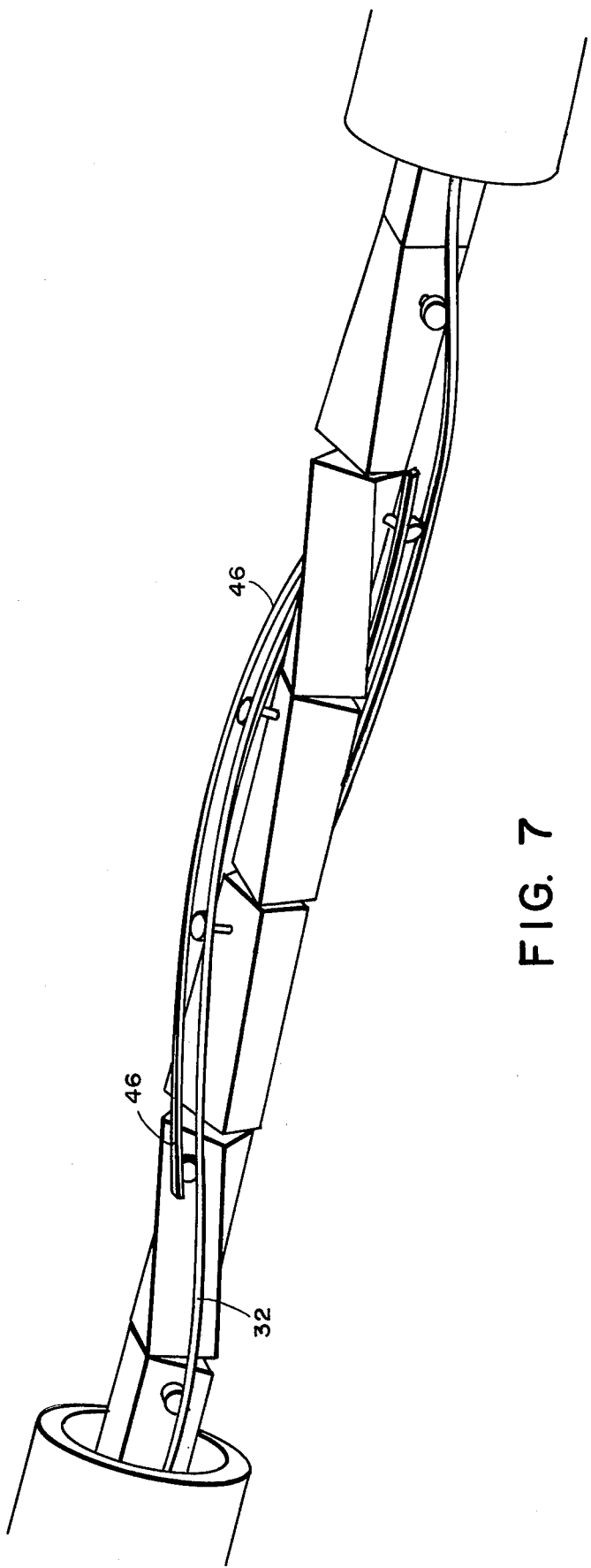
FIG. 7 is a perspective view of a section of the track between stations, wherein the container links are rotated 180°, shown with the conveyor pipe partially removed.

FIG. 7 schematically indicates a section of a track 32 which may be included to invert the containers 22 as they travel from the loading station 10 to an unloading station discussed below. Shown with the tube 12 partially removed, the track 32 travels through a very gradual helical path dictated by the degree of torsional stiffness of the containers 22 and their connecting hinges 27 and 29, the abruptness of the 180° rotation being very greatly exaggerated in FIG. 7 (actually many times the illustrated distance is required for the transition). As indicated, the single-rail tracks 32 on each side of the containers 22 are overlapped by additional appropriately spaced juxtaposed rails 46 for a distance, and at a point where the containers are safely resting on the new rails 46, these become the tracks 32 and the original rails terminate. Rollers or other appropriate means (not shown) may be provided for the area over which the containers are inclined at about 90° to reduce friction and minimize wear. A rotating section of track similar to that shown in FIG. 7 is also included in the return run between the unloading station and the loading station 10.

FIG. 8 schematically shows an unloading station 47 of the conveyor system. The loaded containers 22 enter the station from the transit tube 12 and begin rotating toward vertical orientation with alternate containers being rotated in opposite directions by upper and lower station tracks 23 and 24 similar to those of the loading station 10. Because the containers have been inverted since they left the loading station, their open ends 26 become oriented downwardly as they approach the vertical, densely clustered position, with the closed ends 28 upward. Thus, the unloading step is easily facilitated as the containers move slowly side by side through the central unloading area directly above an exit conduit 49. Similarly to the loading station, the unloading station includes a compacting type screw conveyor 50 in the tapered exit conduit 49, so that the crushed or granular bulk material 16 becomes densely packed prior to its exit. As discussed above, this is to prevent the intrusion of appreciable quantities of air which would raise the pressure of the system. The unloading station 47 also includes a vibrator 51 positioned above the side by side containers 22. The vibrator 51 may include orbital type vibrating means (not shown) so that on each orbit as it engages the container ends, it strikes them while in motion at about the same speed that the containers are traveling. In this instance the vibration helps empty the containers by shaking loose the compacted bulk material within them. Some material may fall from the open ends 26 of the containers as these ends separate from sealed relationship with one another prior to their reaching full vertical orientation, but any such material will fall into the exit conduit 49, due to the shape of the unloading station 47.

As indicated, a vacuum pump 14 is preferably located at the unloading station 47. Such pumps may also be located intermediate the stations as necessary.

A motor 44, a friction driving wheel 43 and a motor enclosure 45 may be connected under the transit tube 11 downstream of the unloading station 47 as indicated. Further driving means may be included as dictated by the distance between the loading and unloading stations. A driving means may also be positioned just upstream of the station in the tube 12.

Immediately before or after the containers 22 are unloaded, their direction of travel must be reversed for their return to the loading station 10. The direction of travel must similarly be reversed near the loading station. Any curve in the path of travel must of course be limited in sharpness to the flexibility of the hinge joints 27 and 29 between containers, the spacing between the container ends, and the flexibility of the containers themselves. Although the container's travel may be reversed by a very gradual curve through 180°, and the containers may be inverted between stations as discussed above in connection with FIG. 7, both the inversion and the reversal of direction may be accomplished through a layout diagrammatically indicated in FIG. 9. Shown in elevation, this transit tube track layout 55 includes large-radius vertical curves 56 and 57 adjacent to the loading and unloading stations 10 and 47. The layout 55 can represent either direction of travel—clockwise or counterclockwise as viewed in FIG. 9—since the inversions may occur either before each station or after each station. The transit tubes 11 and 12 are shown one above the other in FIG. 9, but they may be side by side as they span the distance between the stations.

The above described preferred embodiment provides an efficient apparatus for conveying bulk material over long distances from a remote location to a place of refining, storage, or use on a continuous basis with very low energy requirements. Various other embodiments and alterations to this preferred embodiment will be apparent to those skilled in the art and may be made without departing from the spirit and scope of the following claims.

I claim:
1. A bulk material conveyor, comprising:
    a chain of elongated containers, each having an open end and a closed end and first and second opposed sides;
    hinge means connecting each container with the preceding and succeeding containers, each container being connected by said hinge means at the first side of its open end to the first side of the open end of an adjacent container, and each container being connected at the second side of its closed end to the second side of the closed end of an adjacent contaner, so that when in extended end to end relationship, the chain of containers has aligned first sides and aligned second sides and each container has its open end facing the open end of one adjacent container and its closed end facing the closed end of the other adjacent container;
    first track means for supporting the containers for travel in extended end to end relationship;

drive means for advancing the containers along said first track means;

a loading station in the path of the first track means and including second track means connected to the first track means for pivoting the containers about their hinge means and shifting the orientation of the advancing succession of containers from extended end to end position to dense side by side position with first sides adjacent and second sides adjacent and all open ends oriented in one direction, and for maintaining the side by side orientation through a loading distance;

said loading station including means for feeding bulk material into the open ends of the containers as the containers pass in side by side position through said loading distance;

means on the open ends of the containers for substantially sealing each container with an adjacent container as the containers advance in extended end to end relationship; and an unloading station in the path of the first track means and including second track means connected to the first track means and similar to the second track means at the loading station;

said unloading station including means for unloading the bulk material from the containers as they pass ins ide by side position through an unloading distance;

whereby the containers may be loaded through their open ends while slowly advancing through the loading station; in dense side by side orientation, then advanced at a higher speed in extended end to end relationship toward the unloading station, and unloaded in side by side orientation at the slower speed.

2. The conveyor of claim 1 wherein said first and second track means and said chain of containers form an endless loop including the loading and unloading stations.

3. The conveyor of claim 1 wherein said feeding means includes means for densely packing bulk material into the containers.

4. The conveyor of claim 3 wherein said dense packing means comprises a vibrator engaging the containers as they are loaded, and wherein the unloading means includes a vibrator engaging the containers as they are unloaded for dislodging the densely packed bulk material.

5. The conveyor of claim 1 wherein the containers are oriented with their clustered open ends upward in the loading station, said feeding means being positioned above the path of the open ends for gravity feeding of the bulk material, and downward in the unloading station to unload by gravity, said first track means including means between the loading station and the unloading station for inverting the extended end to end advancing containers to a position wherein the first sides of the containers are upward prior to their entry into the unloading station.

6. The conveyor of claim 5 wherein said first and second track means and said chain of containers form an endless loop including the loading and unloading stations.

7. The conveyor of claim 6 which further includes means enclosing the containers and track means and sutstantially sealing the stations, and means for maintaining a subatmospheric pressure within the closed system.

8. The conveyor of claim 7 wherein said station sealing means comprises means for compacting the bulk material as it is fed into the loading station at said feeding means and as it is fed from the unloading station at said unloading means, to substantially prevent the passage of air into the stations.

9. The conveyor of claim 8 wherein said compacting means comprises a tapered screw conveyor in a tapered conduit.

* * * * *